(12) United States Patent
Milne et al.

(10) Patent No.: US 10,673,795 B2
(45) Date of Patent: Jun. 2, 2020

(54) METHODS AND ARRANGEMENTS FOR CONTENT FILTERING

(75) Inventors: Roger Brent Milne, Boulder, CO (US); Jeffrey C. Ward, Arvada, CO (US); Michael G. Ingoldby, Superior, CO (US); Jonathan B. Ballagh, Boulder, CO (US); Thomas E. Fischaber, Boulder, CO (US); Krista M. Marks, Boulder, CO (US)

(73) Assignee: Disney Enterprises, Inc., Burbank, CA (US)

( * ) Notice: Subject to any disclaimer, the term of this patent is extended or adjusted under 35 U.S.C. 154(b) by 431 days.

(21) Appl. No.: 12/851,538

(22) Filed: Aug. 5, 2010

(65) Prior Publication Data

US 2011/0035456 A1 Feb. 10, 2011

Related U.S. Application Data

(60) Provisional application No. 61/231,658, filed on Aug. 5, 2009.

(51) Int. Cl.
*H04L 12/58* (2006.01)

(52) U.S. Cl.
CPC ............ *H04L 51/12* (2013.01); *H04L 51/063* (2013.01)

(58) Field of Classification Search
USPC ................................................ 709/223–225
See application file for complete search history.

(56) References Cited

U.S. PATENT DOCUMENTS

| | | | |
|---|---|---|---|
| 2003/0023736 A1* | 1/2003 | Abkemeier | G06Q 10/107 709/229 |
| 2005/0080860 A1* | 4/2005 | Daniell | G06Q 10/107 709/206 |
| 2006/0123338 A1* | 6/2006 | McCaffrey et al. | 715/531 |
| 2007/0016641 A1* | 1/2007 | Broomhall | H04L 51/12 709/206 |
| 2007/0288451 A1* | 12/2007 | Meyer | G06F 17/30616 |
| 2008/0134282 A1* | 6/2008 | Fridman et al. | 726/1 |
| 2008/0263159 A1* | 10/2008 | Choi | H04L 51/12 709/206 |
| 2009/0228557 A1* | 9/2009 | Ganz | H04L 51/12 709/206 |

* cited by examiner

*Primary Examiner* — Joshua Joo
(74) *Attorney, Agent, or Firm* — Esplin & Associates, PC

(57) ABSTRACT

Systems and arrangements are provided for filtering language. As presently preferred, these are configured to filter inappropriate language, symbols, words, etc on web sites or used in chat rooms. Embodiments create one or more arrays of inappropriate character strings representing, for example, obscene words and character combinations. Embodiments identify the inappropriate character strings, for example in chat text, and edit them to an appropriate form, for example with cartoon characters, and/or delete the inappropriate character strings. Preferably, at least one embodiment applies the content filter via executing a program of instructions, stored on a tangible storage medium, to achieve this functionality.

20 Claims, 4 Drawing Sheets

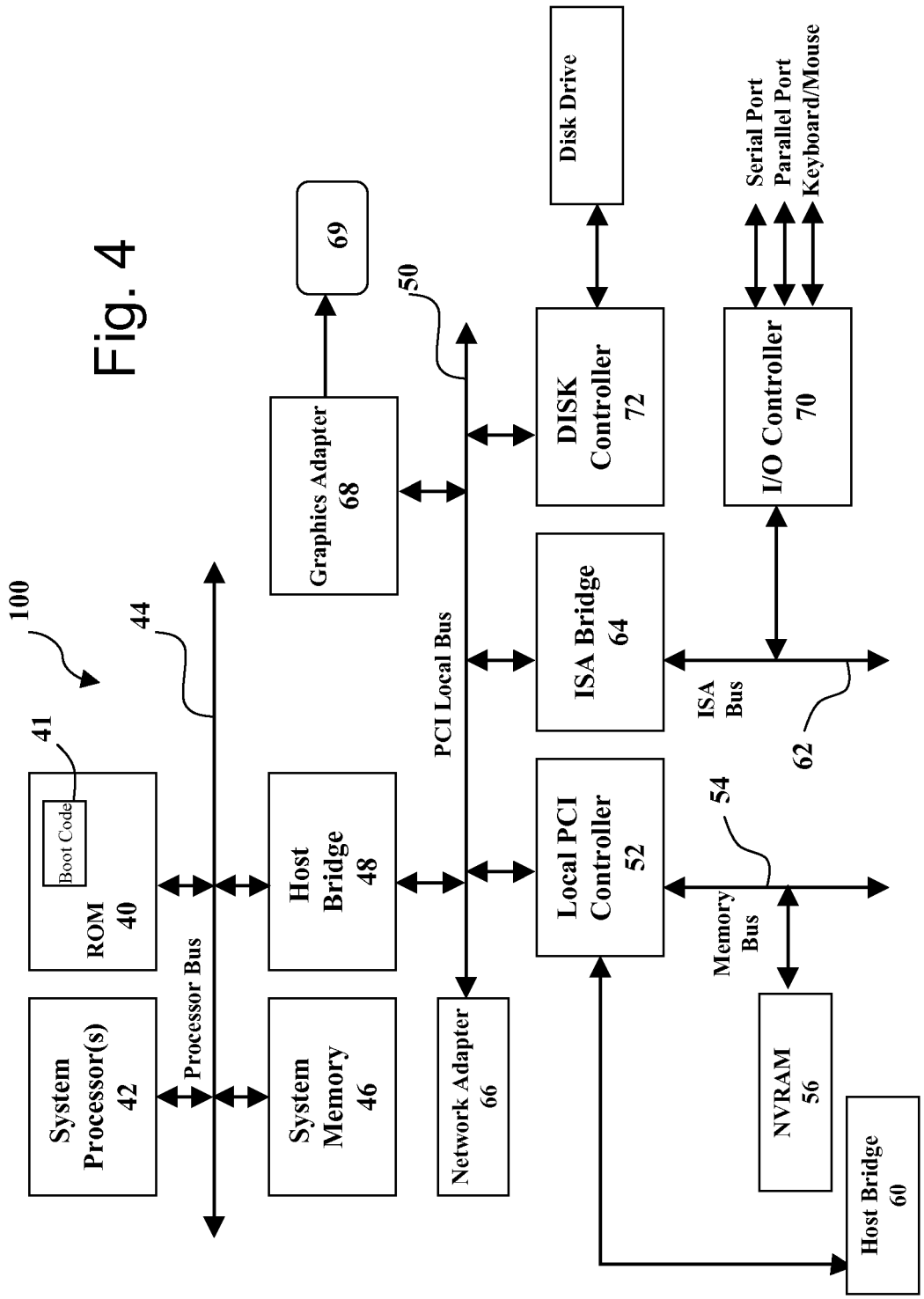

METHODS AND ARRANGEMENTS FOR CONTENT FILTERING

CLAIM FOR PRIORITY

This application claims priority from U.S. Provisional Patent Application Ser. No. 61/231,658, filed on Aug. 5, 2009, and which is incorporated by reference as if fully set forth herein.

BACKGROUND

This disclosure generally relates to methods and apparatus for content filtering and, more particularly, to filtering the content of a communication environment that allows users to communicate with each other and/or the environment through an input device such as a keyboard.

In recent years, following the development and spread of computers, there have been increasing opportunities for users to interact with each other via a communications network. Transmission of information, however, is inherently unsafe. In an environment where much of the communication is done by typing text messages there is no mechanism to guide the messaging interaction between users in the environment in a proper manner. Thus, users may transmit inappropriate messages to other users. Such inappropriate messages may be offensive to those users who view the messages.

BRIEF SUMMARY

The subject matter described herein generally relates to systems and arrangements for content filtering. Embodiments automate the identification and filtering of objectionable material. Input text is processed to prepare the input for matching against previously identified objectionable content. Input is then identified as acceptable, questionable, or objectionable. Various actions may be taken depending on the classification of the input. Where the input has been identified as objectionable, the input may be blocked or the inappropriate language replaced with cartoon style punctuation. Where the input has been identified as questionable, the input may be flagged for manual review. Were the input has been identified as acceptable, no further action may be taken.

In summary, one aspect provides a method for content filtering, the method comprising the steps of: receiving an input of characters entered by a user on a client device; standardizing the input of characters into one or more character strings; and comparing the one or more character strings against a blacklist.

Another aspect provides a computer program product for content filtering comprising: a computer readable storage medium having computer readable program code embodied therewith, the computer readable program code comprising: computer readable program code configured to receive an input of characters entered by a user on a client device; computer readable program code configured to standardize the input of characters into one or more character strings; and computer readable program code configured to compare the one or more character strings against a blacklist.

A further aspect provides a system for content filtering, the system comprising: one or more processors; and a memory operatively connected to the one or more processors; wherein, responsive to execution of computer readable program code accessible to the one or more processors, the one or more processors are configured to: receive an input of characters entered by a user on a client device; standardize the input of characters into one or more character strings; and compare the one or more character strings against a blacklist.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4 illustrates a non-limiting example of a computer system.

DETAILED DESCRIPTION

Figure 1:
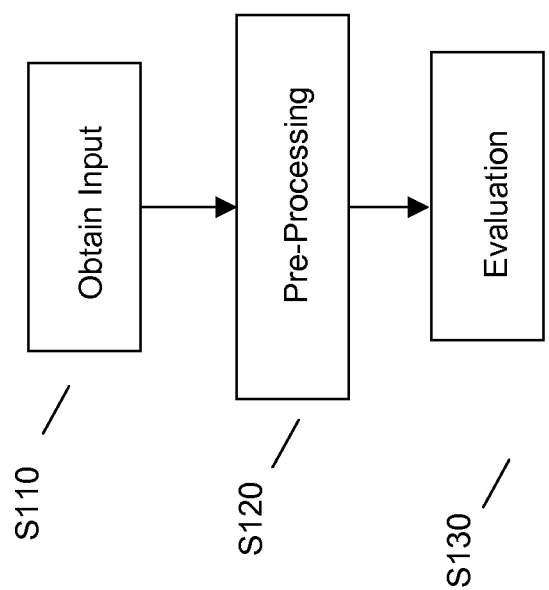
FIG. 1 illustrates a method.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

The identification of inappropriate text is important in many settings, and can be particularly important and challenging in the context of Internet sites that allow users to contribute text. To identify inappropriate text with high fidelity (i.e., with sufficiently low rates of false positives and false negatives) typically requires human moderation and oversight, which can be costly and slow. In some cases (e.g., online chat-type applications) where complete real-time moderation is impractical, an automated software solution is necessary.

The inventors have recognized the need to filter messages with inappropriate content is particularly acute when the expected users include children. Examples of such communication networks include http://www.disney.go.com/create, Club Penguin (http://www.clubpenguin.com) and Kerpoof (http://www.kerpoof.com). A common feature of such sites is the ability of users to create material (including textual material) and have the created material visible to others.

Content filtering, particularly when children are creating the content, is a challenge. Children have a tendency to be very creative and a natural desire to test the rules. In the past textual creations of children have been content filtered against a known "black" list, e.g., the content created by a child will be checked to determine if it contains any words on a "black" list. While the word ABCD may be on the blacklist, once a child learns this, the child may write the word as A_B_C_D or A B C D, thus conveying the meaning of the word to the reader while the word itself does not appear in the "blacklist". Alternatively, the word ABCD may be written substituting a symbol (i.e., $) for a letter (i.e., "S") or substituting other letters for certain letters (i.e., the letter "l" for the letter "i", an "!" for the letter "l" or "i", or a "1" for the letter "l" or "i").

Typically once the maintainer of the "blacklist" finds out the list is somehow being subverted, the list is expanded to include the subversion. Thus, what starts off as a simply "blacklist" may grow exponentially to include any number of permutations of the original "blacklisted" word (i.e., not only does "blacklist" include ABCD, the "blacklist" now includes A_B_C_D, A B C D, ABC$, AB!D, A_B_C_$ and the like). The greater the size of the "blacklist", however, the longer it takes to compare a word against the "blacklist" and greater computing resources are needed. Thus, the more secure (or comprehensive) the "blacklist" is, the higher the cost. This cost impacts the ability to utilize a "blacklist" in real time situations.

Moreover, there are particular challenges arising from operating in an environment where site visitors will attempt to create inappropriate text that is not detected by moderating software, but will still be recognized as inappropriate by other site visitors. The techniques used must also run quickly, often in real time as text is generated and flows through the system.

The inventors have recognized it is possible to maintain a much smaller "blacklist" than is traditional by pre-processing the input. Doing so minimizing the costs associated with the "blacklist" and permits the "blacklist" based content filtering to be used in additional scenarios, such as real time input.

Embodiments of the present invention provide a utility, executed for example by computer system, for filtering language. As presently preferred, the utility is configured to filter inappropriate language, symbols, words, etc. on web sites or used in chat rooms. Embodiments of the invention create one or more arrays of inappropriate character strings representing, for example, obscene words and character combinations. Embodiments of the invention identify the inappropriate character strings, for example in chat text, and edit them to an appropriate form, for example with cartoon characters, and/or delete the inappropriate character strings. Preferably, at least one embodiment of the invention applies the content filter via executing a program of instructions, stored on a tangible storage medium, to achieve this functionality.

For purposes of discussion, a few made-up words will be defined for our list of inappropriate words, or obscenities:
  alk, alkman, alks, fazz, foru Also, it is a common problem that phrases may be obscene or inappropriate while not containing any words that are themselves inappropriate. Again for purposes of discussion, we will use made-up a phrase of common words that are to be treated as inappropriate when they appear as:
  park walking When attempting to defeat automated language filters, there are several techniques that authors will typically use to disguise their inappropriate text:
1. Repeating letters:
  "Faaaaazz" for "Fazz"
  "alkkkkkk" for "alk"
2. Interspersing whitespace:
  "Those are al ks" for "Those are alks"
3. Interspersing punctuation:
  "F.A.Z.Z." for "fazz"
  "a*L*k" for "alk"
4. Replacing letters with symbols:
  "f@zz" for "fazz"
  "AL|<" for "alk"
5. Combinations (composites) of the above techniques The description now turns to the figures. The illustrated example embodiments will be best understood by reference to the figures. The following description is intended only by way of example and simply illustrates certain selected example embodiments representative of the invention, as claimed.

To provide some context for the problem area addressed by embodiments, FIG. 1 illustrates a high level overview of an embodiment. As shown, at Step S110 the input is obtained from the appropriate source. In the instance of real time usage, this may be either as the input is typed at a keyboard (or other input device) or after the input is entered (for example, after the enter key is pressed).

At Step S120, the obtained input goes through pre-processing to standardize the input. In general, the purpose of the pre-processing is to reduce the need to have an expansive "blacklist". Additional information regarding this pre-processing is discussed with reference to FIG. 2.

At Step S130, the pre-processed input is evaluated against a "blacklist" in a known manner. Preferably, the results of such an evaluation are either a word, phrase, or pattern within a word is non-objectionable (i.e., clean), objectionable, or questionable. Action is then taken accordingly. In the case of a clean word, phrase, or pattern, such actions may include permitting the inputted material to remain in the input stream. Once the pre-processed input has been evaluated (or flagged) to be questionable or objectionable, appropriate action may be taken. In the case of an objectionable word, phrase, or pattern within a word the objectionable material may be deleted from the input, or the entire input may be deleted. In the case of questionable material, either the questionable material or the entire input may be flagged to permit further review. In such a case, the flagging may include visually indicating the questionable material for ease of reference in further review, or segregating the input containing the questionable material until it has undergone further review, or the like. Additionally, reviewers may be notified of the existence of the questionable material, the questionable material may be forwarded to a review, etc.

Figure 2:
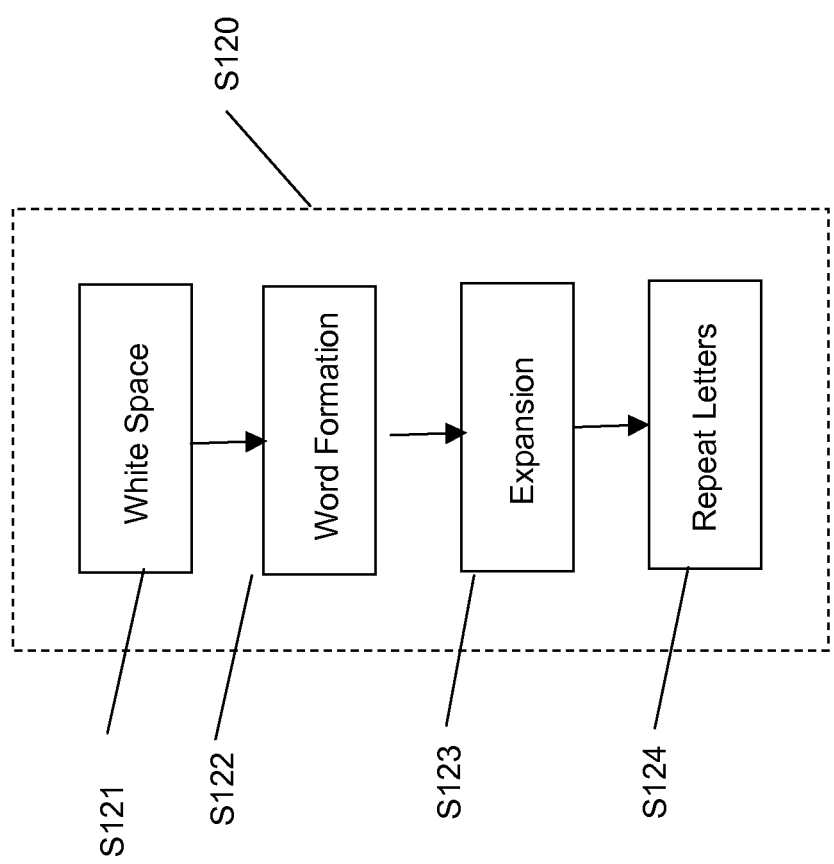
FIG. 2 illustrates particulars of the method.

Referring now to FIG. 2, more detail on the pre-process Step S120 is shown. While the additional detail is shown in sequential order, the order is merely a current preference and the steps may be performed in any appropriate order.

Preferably, at Step S121 input is collapsed around white space within the input. Given an input string S, the following processing is done: the string is translated into a canonical form by a) converting any uppercase to lowercase; b) turning all whitespace (defined as a set of characters which can be defined) into space characters (ASCII 32); and c)

removing repeated spaces (ASCII 32) such that single spaces remain. White space generally refers to a set of characters which have been defined as white space. It is presently preferred that white space include a space (ASCI 32), a tab (ASCII 9), new line (ASII 12), and carriage return (ASCII 15), although any desirable characters may be defined to be white space.

At Step S122 character strings (words) are formed from the output of Step S121. During this step, inter alia, punctuation is removed, underscoring is removed, and whitespace characters may also be selectively removed. By way of example, "a.b.c.d" and "a_b_c_d" would both become "abcd".

Multiple ways to possibly break the string into words are determined. This can be viewed as taking the string S and creating multiple derived strings, S1, S2, . . . SN with whitespace-delimited words. These derived strings are constructed as described in the following paragraphs.

Defining a list of characters (typically punctuation and whitespace) that expand into multiple interpretations including (1) being whitespace, i.e. word separators (2) being part of words, (3) being ignored [i.e. becoming the null character—i.e. being deleted]. For example, the character "–" might be treated as either whitespace or a null character, while the character "+" might have both of these interpretations as well as being a possible word part (e.g. a stand in for the letter "t").

For each such character appearing in the string S, creating derived strings S1, S2, S3 based on these character interpretations, replacing the said character with each possible interpretation. Then repeating the process for the derived strings to create all possible combinations. In the cases where whitespace is being optionally removed, e.g., in the example where "a b c d" becomes "abcd", embodiments proceed by identifying a limited set of whitespace for optional removal by examining the contents of adjacent words for length, vowel counts, consonant counts, and other statistical language patterns. For example, whitespace may be selectively deleted between words that have less than two vowels so that A B C D becomes ABCD.

In the event that the expansion described here would result in a value of N that exceeds a preset threshold (e.g, when there are many punctuation characters in S, each with multiple possible expansions), embodiments proceed by prioritizing and limiting the choice of such expansions until N will not exceed the threshold. The prioritization can be based on a prioritization of the punctuation characters and their absolute placement in S and their relative proximity to other characters.

Such thresholds are policy based decision which may be made based upon any number of factors including available computing power and tolerance for not catching every possible offensive word.

Given S1, . . . SN, each string is then broken into its constituent words, W1a . . . W1m, W2a, . . . , etc., at whitespace boundaries.

Whenever new strings or words are derived from S, mappings are created that tie each character in Si and word variant Wj to its source character in S. (So that if it is later determined that Wj is inappropriate, it is know what portion of S to flag as inappropriate).

At Step S123 the word output of Step S122 is expanded. At this point in the process the formed words are checked to determine if there are any symbols or characters that are used to represent the other proper characters (i.e., have characters been substituted). An example of this would be using an "L" (ASCII 108) for an "i" (ASCII 105), using a "1" (ASCII 49) for an "l" (ASCII 108), using an "!" (ASCII 33) for either an "l" (ASCII 108) or "i" (ASCII 105), using a "$" (ASCII 36) for an "S" (ASCII 83), or the like.

For each word W, multiple possible interpreted words W1, . . . , WN are generated by defining a list of characters and strings that each expand into a list of interpreted strings, e.g.:

'v'-->'v', or 'u'
'@'-->'a'
'!'-->'i', or 'l'
'4'-->'', 'a', 'for', or 'fore'
'|<'-->'k'

Note that some characters map only to a single character, some map to empty strings or substrings (as in the case of '4'), and the letter v may be interpreted as a v or a u.

For each such character appearing in the word W, creating derived words W1, W2, W3 based on these character interpretations, replacing the said character with each possible interpretation. Then repeating the process for the derived strings to create all possible combinations. For example, using the above mappings, the initial W='4v' would expand to {v, u, av, au, forv, foru, forev, foreu}

In the event that the expansion described here would result in a value of N that exceeds a preset threshold (i.e. when there are many ambiguous symbolic characters in W, each with multiple possible expansions), embodiments proceed by prioritizing and limiting the choice of such expansions until N will not exceed the threshold. The prioritization can be based on a prioritization of the symbolic characters and their absolute placement in W and their relative proximity to other ambiguous characters. An example W that would yield a large number of expansions would be 44!!4. In an alternative embodiment, embodiments simply discard from consideration any words W that would expand to N exceeding a preset threshold. (Note that such sequences of symbols with ambiguous interpretations generally cannot be interpreted by a reader, hence are not offensive). Such thresholds are policy based decision which may be made based upon any number of factors including available computing power and tolerance for not catching every possible offensive word.

At Step S124, the expanded word output of Step S123 is preferably reviewed for any repeated letters or symbols. Objectionable words, at least in the English language, do not have more than two repeating characters. Thus, when more than two repeating characters are found, the number of characters is collapsed to two characters. An example would be collapsing ABCCCCC to ABCC. Where there are two repeating characters, this word is considered to be a word as written and also the word with the repeating character removed; thus, the input set is expanded. An example would be expanding ABCC to both ABCC and ABC. Thus, for any words (in the expanded list) that contain sequences of two or more repeated letters, e.g., fazzz, embodiments replace the word in the list with two alternatives, one with the letter repeated twice (e.g. fazz), and one with the letter unrepeated (e.g. faz).

It should be noted that the steps in paragraph 0043 and 0045 are each applied iteratively to expand the word list and the limiting of step in paragraph 0044 is applied to the composite expansion.

Figure 3:
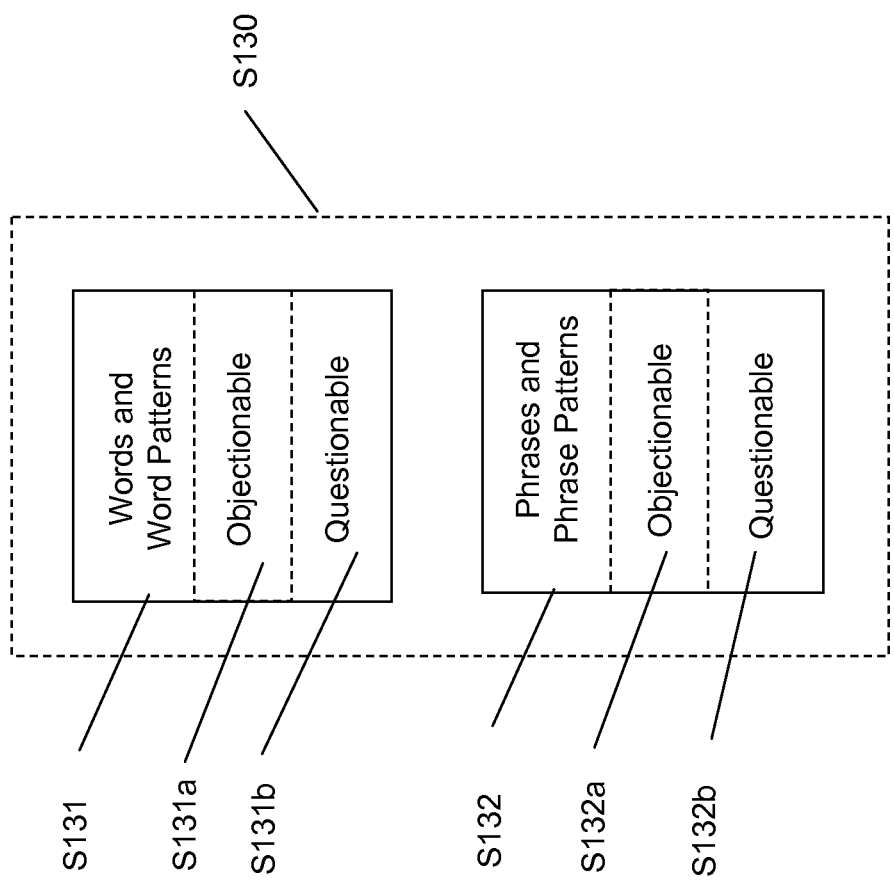
FIG. 3 illustrates further particulars of the method.

Referring now to FIG. 3, additional information is illustrated with respect to the evaluation step S130. While the additional information is shown in sequential order, the order is merely a current preference and the steps may be performed in any appropriate order.

At step S131 the currently identified words are reviewed to determine whether they contain objectionable or questionable words or word patterns (i.e., character patters within a word such as subwords or embedded words (e.g., prefixes, suffices, and the like)). An example of such a word is CLASS, wherein the last three characters of the word form an objectionable word. At S131a the currently identified words are checked against a blacklist for objectionable words and word patterns. At S131b the currently identified words are checked against a blacklist of questionable words and word patterns.

At Step S132 the currently identified words are reviewed to determine whether adjacent words which are otherwise acceptable may form objectionable or questionable phrases (i.e., multiple word combinations). An example of such a phrase (for the purposes of illustration) is "park walking", which if formed of the acceptable words "park" and "walking". It may be that an objectionable phrase is made up of more than two words. At S132a the currently identified words are checked against a blacklist for objectionable phrases and phrase patterns. At S132b the currently identified words are checked against a blacklist for objectionable phrases and phrase patterns.

Returning now to Step S130, the evaluation against a "blacklist" is preferably done in several ways. For each complete string in the expanded list, S1 . . . SN, (this is for the multi-word strings, the broken out words are considered in the following paragraph), the complete string is compared against a blacklist of character sequences and patterns that occur in objectionable text, but never in non-objectionable text. From the above list of objectionable content, 'fazz' and 'park walk' would be blacklisted, but not 'alk' as alk is a common letter sequence, e.g. in 'talk'.

Each word, W, is preferably compared against a blacklist of word patterns that include the matching types exactly-matches, begins-with, and ends-with (note that begins-with and ends-with are frequent test cases for obscenities). From the above list of objectionable content, the included blacklist word patterns would include begins-with 'alk'
begins-with 'fazz'
ends-with 'foru'.

Adjacent words Wa and Wb (where by 'adjacent' means words whose position is adjacent in the source string Si), are compared against a blacklist of word sequences (phrases or phrase patterns), e.g., 'park'+ 'walk', from the above example.

It is presently preferred that at least four separate blacklists be maintained: 1) objectionable words and word patterns; 2) questionable words and word patterns; 3) objectionable phrases; and 4) questionable phrases. Additional blacklists may also be maintained or fewer blacklists may be maintained, where certain blacklists are combined.

Referring now to FIG. 4, there is depicted a block diagram of an illustrative embodiment of a computer system 100. The illustrative embodiment depicted in FIG. 1 may be an electronic device such as a desktop or workstation computer or a server computer, including a web server, to which client computers are operatively connected. As is apparent from the description, however, the embodiments of the invention may be implemented using any of a wide variety of devices or combinations of devices. An example device that may be used in implementing one or more embodiments includes a computing device in the form of a computer 100.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces electronic device 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, etc. A disk controller 72 connects a disk drive with PCI local bus 50. The USB Bus and USB Controller (not shown) are part of the Local PCI controller (52).

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for real-time content filtering in an online chat application, the method comprising the steps of:
   receiving, at a remote web server hosting an online chat application, an input of characters entered by a user on a client device, the input of the characters being received in real time based on an ongoing real-time chat session between the user of the client device and one or more other users of one or more other client devices; and
   filtering, at the web server, the input of characters in real-time to maintain the ongoing real-time chat session by:
      standardizing the input of characters into one or more character strings, wherein standardizing the input of characters into one or more character strings comprises processing the input of characters to:
      selectively remove white spaces based on a statistical language pattern comprising examining content of words having more than one character, wherein the content of words is selected from the group consisting of vowel counts and consonant counts;
      break the one or more character strings into words at remaining white space boundaries; and
      expand one or more of the words resulting from breaking the one or more character strings;
      comparing the one or more character strings against a blacklist; and
      providing, based upon the one or more character strings matching a character string included on the blacklist, an indication that the one or more character strings are included on the blacklist.

2. The method according to claim 1, wherein standardizing the input of characters into one or more character strings includes one or more of:
   replacing one or more repeated characters in the input of characters with one or more standardized characters to form the one or more character strings;
   replacing one or more symbols in the input of characters with one or more letters to form the one or more character strings; or
   removing one or more punctuation characters in the input of characters to form the one or more character strings.

3. The method according to claim 1, wherein standardizing the input of characters into one or more character strings further includes identifying one or more phrases represented by the one or more character strings.

4. The method according to claim 3, wherein comparing the one or more character strings against the blacklist further comprises comparing one or more of the words and the one or more phrases to the blacklist.

5. The method according to claim 4, further comprising flagging one or more input of characters identified as representing one or more of: one or more of the words or the one or more phrases matching the blacklist.

6. The method according to claim 4, further comprising automatically deleting one or more input of characters identified as representing one or more of: one or more of the words or the one or more phrases matching the blacklist.

7. The method according to claim 4, further comprising delaying posting on a web site one or more input of characters identified as representing one or more of: one or more of the words or the one or more phrases matching the blacklist.

8. The method according to claim 5, further comprising receiving input indicating one or more flagged input of characters matching the blacklist are to be deleted.

9. The method according to claim 8, further comprising deleting the one or more flagged input characters matching the blacklist responsive to the indication.

10. The method according to claim 9, wherein:
the input of characters comprises text input of characters communicated from the client device to the web server; and
the standardizing the input of characters into one or more character strings and the comparing the one or more character strings against a blacklist steps are performed by the web server.

11. A computer program product for real-time content filtering in an online chat application comprising:
a non-transitory computer readable storage medium having computer readable program code embodied therewith, the computer readable program code being executed by a remote web server hosting an online chat application to cause the web server to receive an input of characters entered by a user on a client device, the input of the characters being received in real time based on an ongoing real-time chat session between the user of the client device and one or more other users of one or more other client devices; and
filter the input of characters in real-time to maintain the ongoing real-time chat session by:
standardizing the input of characters into one or more character strings, wherein standardizing the input of characters into one or more character strings comprises processing the input of characters to:
selectively remove white spaces based on a statistical language pattern comprising examining content of words having more than one character, wherein the content of words is selected from the group consisting of vowel counts and consonant counts;
break the one or more character strings into words at remaining white space boundaries; and
expand one or more of the words resulting from breaking the one or more character strings;
comparing the one or more character strings against a blacklist; and
providing, based upon the one or more character strings matching a character string included on the blacklist, an indication that the one or more character strings are included on the blacklist.

12. The computer program product according to claim 11, wherein standardizing the input of characters into one or more character strings includes one or more of:
replacing one or more repeated characters in the input of characters with one or more standardized characters to form the one or more character strings;
replacing one or more symbols in the input of characters with one or more letters to form the one or more character strings; or
removing one or more punctuation characters in the input of characters to form the one or more character strings.

13. The computer program product according to claim 12, wherein to standardizing the input of characters into one or more character strings further includes identifying one or more phrases represented by the one or more character strings.

14. The computer program product according to claim 13, wherein comparing the one or more character strings against the blacklist further comprises comparing one or more of the words and the one or more phrases to the blacklist.

15. The computer program product according to claim 14, further comprising computer readable program code configured to flag one or more input of characters identified as representing one or more of: one or more the words or the one or more phrases matching the blacklist.

16. The computer program product according to claim 14, further comprising computer readable program code configured to automatically delete one or more input of characters identified as representing one or more of: one or more of the words or the one or more phrases matching the blacklist.

17. The computer program product according to claim 14, further comprising computer readable program code configured to delay posting on a web site one or more input of characters identified as representing one or more of: one or more of the words or the one or more phrases matching the blacklist.

18. The computer program product according to claim 15, further comprising computer readable program code configured to receive input indicating one or more flagged input of characters matching the blacklist are to be deleted.

19. The computer program product according to claim 18, further comprising computer readable program code configured to delete the one or more flagged input characters matching the blacklist responsive to the indication.

20. A system for real-time content filtering in an online chat application, the system comprising:
one or more processors; and
a memory operatively connected to the one or more processors;
wherein, responsive to execution of computer readable program code accessible to the one or more processors, the one or more processors are configured to:
remotely host an online chat application to facilitate ongoing real-time chat sessions between users on client devices;
receive, at the one or more processors hosting the online chat application, an input of characters entered by a user on a client device, the input of the characters being received in real time based on an ongoing real-time chat session between the user of the client device and one or more other users of one or more other client devices; and
filter, at the one or more processors hosting the online chat application, the input of characters in real-time to maintain the ongoing real-time chat session by:
standardizing the input of characters into one or more character strings, wherein to standardize the input of characters into one or more character strings comprises processing the input of characters to:
selectively remove white spaces based on a statistical language pattern comprising examining content of words having more than one character, wherein the content of words is selected from the group consisting of vowel counts and consonant counts;
break the one or more character strings into words at remaining white space boundaries; and
expand one or more of the words resulting from breaking the one or more character strings;
comparing the one or more character strings against a blacklist; and providing, based upon the one or more character strings matching a character string included on the blacklist, an indication that the one or more character strings are included on the blacklist.

\* \* \* \* \*

UNITED STATES PATENT AND TRADEMARK OFFICE
CERTIFICATE OF CORRECTION

PATENT NO. : 10,673,795 B2
APPLICATION NO. : 12/851538
DATED : June 2, 2020
INVENTOR(S) : Roger Brent Milne Page 1 of 1

It is certified that error appears in the above-identified patent and that said Letters Patent is hereby corrected as shown below:

In Claim 13, Column 11, Line 64, delete "to".

Signed and Sealed this
Eighteenth Day of August, 2020

Andrei Iancu
*Director of the United States Patent and Trademark Office*